United States Patent [19]

Ainger et al.

[11] 3,994,823

[45] Nov. 30, 1976

[54] CERAMIC MATERIAL AND METHOD OF MAKING

[76] Inventors: Frank William Ainger, Hoarstone House, Bugbrooke, Northampton; Stephen George Porter, 20 Leys Road, Pattishall, Northampton, both of England

[22] Filed: Aug. 22, 1973

[21] Appl. No.: 391,322

[30] Foreign Application Priority Data
Aug. 25, 1972 United Kingdom............... 39661/72

[52] U.S. Cl......................... 252/301.1 R; 252/62.9; 106/39.8; 106/39.5; 106/39.6; 106/57; 106/73.3
[51] Int. Cl.² ........................................ C09K 3/00
[58] Field of Search.................... 106/39.8, 73.3, 57, 106/39.5, 39.6, 62.9; 252/301.1 R

[56] References Cited
UNITED STATES PATENTS 3,666,665   5/1972   Chapman et al............... 106/39.5 X 3,767,579   10/1973   Tsubouchi et al................. 252/62.9

*Primary Examiner*—Stephen J. Lechert, Jr.
*Attorney, Agent, or Firm*—Fleit & Jacobson

[57] ABSTRACT

A ceramic material, which consists of lead zirconate with not greater than 20 atomic per cent of bismuth substituted for the lead, according to the formula $Pb_{1-3x/2}Bi_xZrO_3$. Titanium to a concentration of not more than 50 atomic per cent can be substituted for the zirconium according to the formula $Pb_{1-3x/2}Bi_x Zr_{1-y}Ti_y O_3$. Potassium to a concentration of 2 to 20 atomic per cent can also be substituted for the lead in any of these materials, according to either the formula $Pb_{1-3x/2-z/2}Bi_xK_zSrO_3$ or the formula $Pb_{1-3x/2-z/2}Bi_xK_zZr_{1-y}Ti_yO_3$. Uranium can also be included in any one of these ceramic materials to a concentration of not more than 10 atomic per cent. All of the ceramic materials can be produced by ceramic processes and sintering techniques.

42 Claims, No Drawings

CERAMIC MATERIAL AND METHOD OF MAKING

The invention relates to ceramic materials and to methods of producing these materials.

The invention provides a ceramic material which consists of lead zirconate with not greater than 20 atomic per cent of bismuth substituted for the lead according to the formula $Pb_{1-(3x/2)}Bi_xZrO_3$. The values of $x$ can lie between 0 and 0.20.

According to a feature of the invention a ceramic material as outlined in the preceding paragraph is provided which includes not more than 50 atomic per cent of titanium substituted for the zirconium according to the formula $Pb_{1-(3x/2)}Bi_xZr_{1-y}Ti_yO_3$. The values of $x$ can lie between 0 and 0.20 and the values of $y$ can lie between 0 and 0.50.

According to another feature of the invention a ceramic material as outlined in either of the two preceding paragraphs is provided which includes 2 to 20 atomic per cent of potassium substituted for the lead according to either the formula $Pb_{1-(3x/2)-(z/2)}Bi_xK_zZrO_3$ or the formula $Pb_{1-(3x/2)-(z/2)}Bi_xK_zZr_{1-y}Ti_yO_3$. The values of $x$ and $z$ can lie between 0 and 0.20 providing $x$ exceeds or is equal to $z$ and the values of $y$ can lie between 0 and 0.50.

According to a further features of the invention a ceramic material as outlined in any of the preceding paragraphs is provided which includes not more than 10 atomic per cent of uranium.

The invention also provides a method of producing a ceramic material including the steps of providing solutions of tetra-n-butoxides of titanium and zirconium in an isopropanol solvent; mixing the solutions to form an alkoxide mixture; adding water to the alkoxide mixture to form a hydrolysed slurry of mixed oxides; drying the slurry; calcining the dried slurry to provide calcined zirconia and titania powder; providing lead oxide and bismuth oxide powders in the desired stoichiometric proportions; mixing the lead and bismuth oxide powders with the calcined zirconia and titania powder to provide a fine, evenly dispersed mixture; milling the powder mixture under acetone; drying and sieving the milled powder through a 350$\mu$m mesh; calcining the powder mixture; sieving the calcined powder mixture; compacting the powder mixture into a desired shape; and hot pressing the compacted shape.

According to a feature of the invention a method as outlined in the preceding paragraph is provided which includes the steps of providing a desired amount of potassium oxalate powder; mixing the potassium oxalate powders with the other powders during the powder mixing step; re-milling the calcined powder mixture under acetone; drying and sieving the re-milled powder mixture. Approximately 7 weight per cent of a binder material can be added to the powder mixture before the compacting step, the binder material being such that it is capable of being burnt out at a temperature below 500° C. The binder material, when present, is burnt out before the hot pressing step.

According to another feature of the invention a method as outlined in either of the two preceding paragraphs is provided which includes the steps of providing a desired amount of uranium oxide powder; and mixing the uranium oxide powder with the other powders during the powder mixing step.

The foregoing and other features according to the invention will be better understood from the following description of specific embodiments of the invention.

A ceramic material according to the invention consists of lead zirconate ($PbZrO_3$) with 2 to 20 atomic per cent of bismuth substituted for the lead according to the formula $Pb_{1-(3x/2)}Bi_xZrO_3$. The trivalent bismuth ions are substituted for divalent lead in the ratio two to three leaving some vacancies on the A site i.e. the lead site.

The substitution of bismuth for the lead inhibits grain growth. Thus fully dense ceramic material of compositions with $x$ varying between 0 and 0.20 can be produced such that the perovskite structure is retained. These ceramic materials which are stable dielectric materials typically contain submicron grains that facilitate the preparation of thin ceramic plates of thicknesses of the order of 25 $\mu$m. Compositions with no bismuth additions exhibit grain sizes of 5 to 10 $\mu$m when prepared under the same conditions as the bismuth containing ceramic materials.

As the bismuth concentration is increased, the relative permittivity of the ceramic material decreases, and the Curie point is also slightly decreased as indicated by a maximum value of relative permittivity when plotted as a function of temperature.

The lead bismuth zirconate materials outlined in the preceding paragraphs can include not more than 50 atomic per cent of titanium substituted for the zirconium according to the formula $Pb_{1-(3x/2)}Bi_xZr_{1-y}Ti_yO_3$. Substantially all of these ceramic materials are stable ferroelectric materials having pyroelectric, ferroelectric and piezoelectric properties.

The values of $x$ can lie between 0.02 and 0.20 and the values of $y$ can lie between 0.00 and 0.50 to provide material compositions which exhibit a variety of useful properties. For example, ceramic materials having compositions wherein $x$ lies between 0.05 and 0.20 and wherein $y$ lies between 0.10 and 0.50, exhibit, as will be subsequently shown, very high remanent polarisation and have a relatively low dielectric constant. These ceramic materials can be used for charge generation devices; the relatively low dielectric constants allowing high voltage to be produced.

Lead bismuth zirconate titanate ceramic materials according to the above-mentioned formula and having compositions wherein $x$ lies between 0.05 and 0.20 and wherein $y$ lies between 0.05 and 0.10, have, as will be subsequently shown, a high pyroelectric coefficient and a low dielectric constant. These ceramic materials are especially adapted for use in pyroelectric infra-red detectors or detector arrays and thermal imaging systems such as infra-red television cameras.

Potassium can be included in any one of the ceramic materials outlined in the preceding paragraphs to a concentration of not greater than 20 atomic per cent. The potassium is substituted for the lead in the lead bismuth zirconate material and in the lead bismuth zirconate titanate material respectively, according to the formula $Pb_{1-(3x/2)-(z/2)}Bi_xK_zZrO_3$ and $Pb_{1-(3x/2)-(z/2)}Bi_xK_zZr_{1-y}Ti_yO_3$. The values of $x$ and $z$ can lie between 0 and 0.20 providing $x$ exceeds or is equal to $z$ and the values of $y$ can lie between 0 and 0.50. When $x$ equals $z$ the potassium eliminates the vacancies in the lattice structure which can act as charge trapping centres and effects a reduction in the electrical resistivity accompanied by an increase in relative permittivity. The potassium also aids the sintering process during production of these ceramic materials and also facilitates the production of homogeneous ceramics.

Uranium can be included in any one of the ceramic materials outlined in the preceding paragraphs to a concentration of not more than 10 atomic per cent in order to effect a reduction in the electrical resistivity and relative permittivity of the materials. These ceramic materials are especially adapted for use as targets in pyroelectric vidicon tubes.

The observed properties of typical ceramic materials according to the invention are given in the following table.

| Material Composition (see below) | Relative Permittivity | Curie Point (° C) | Resistivity ($\Omega$-m) | Remanant Polarisation (C m$^{-2}$) | Pyroelectric Coeff'nt at 20° C. |
|---|---|---|---|---|---|
| A | 125 | 230 | | 0 | 0 |
| B | 110 | 215 | | 0 | 0 |
| C | 660 | | | 0.55 | 3.3 |
| D | 670 | | | 0.70 | 2.4 |
| E | 250 | 213 | | 0.40 | 3.7 |
| F | 240 | 210 | $5 \times 10^{10}$ | 0.42 | 3.5 |
| G | 210 | 210 | $1.5 \times 10^{9}$ | 0.42 | 3.2 |
| H | 280 | 189 | $7 \times 10^{10}$ | | 3.4 |
| I | 400 | 162 | $3 \times 10^{7}$ | | 1.9 |
| J | 380 | 150 | $5 \times 10^{10}$ | | 2.5 |

$A = Pb_{0.85}Bi_{0.10}ZrO_3$
$B = Pb_{0.70}Bi_{0.20}ZrO_3$
$C = Pb_{0.85}Bi_{0.10}Zr_{0.60}Ti_{0.40}O_3$
$D = Pb_{0.70}Bi_{0.20}Zr_{0.50}Ti_{0.50}O_3$
$E = Pb_{0.94}Bi_{0.04}Zr_{0.92}Ti_{0.08}O_3$
$F = Pb_{0.88}Bi_{0.08}Zr_{0.92}Ti_{0.08}O_3$
$G = Pb_{0.88}Bi_{0.08}Zr_{0.92}Ti_{0.08}O_3$ + 1 atom % U
$H = Pb_{0.86}Bi_{0.08}K_{0.04}Zr_{0.92}Ti_{0.08}O_3$
$I = Pb_{0.84}Bi_{0.08}K_{0.08}Zr_{0.92}Ti_{0.08}O_3$
$J = Pb_{0.84}Bi_{0.08}K_{0.08}Zr_{0.92}Ti_{0.08}O_3$ + 1 atom % U In many of the materials outlined in the preceding paragraphs, a phase change, between two ferroelectric phases, has been observed at or near to room temperature. This change is evidenced by a sudden change in polarisation, the pyroelectric coefficient changing to very high values over a relatively small temperature range.

The phase transition properties of these ceramic materials can be used for device giving a high charge or voltage generation for a relatively small change in temperature.

It should be noted that there is a temperature hysteresis associated with the phase transition effect, but this hysteresis can be removed by the application of a suitable electric field in the poling direction when the temperature is decreasing. Thus, by means of synchronous chopping and the application of an appropriate electric field, a very sensitive pyroelectric infra-red radiation detector can be constructed utilising these ceramic materials.

The observed phase transition properties of typical ceramic materials according to the invention are given in the following tables.

| | Increasing Temperature | |
|---|---|---|
| Material Composition. | Transition Temp. $T_1$(° C) | Max. Pyro-Electric Coeffn't ($10^{-4}$C m$^{-2}$K$^{-1}$) |
| $Pb_{0.88}Bi_{0.08}Zr_{0.92}Ti_{0.08}O_3$ | 50 | 23 |
| $Pb_{0.94}Bi_{0.04}Zr_{0.92}Ti_{0.08}O_3$ | 49 | 40 |
| $Pb_{0.88}Bi_{0.08}Zr_{0.94}Ti_{0.06}O_3$ | 16 | 29 |
| $Pb_{0.88}Bi_{0.08}Zr_{0.92}Ti_{0.08}O_3$ + 1 atom % U | 48 | 11 |

| | Decreasing Temperature | |
|---|---|---|
| Material Composition. | Transition Temp. $T_2$(° C) | Max. Pyro-Electric Coeffn't ($10^{-4}$C m$^{-2}$K$^{-1}$) |
| $Pb_{0.88}Bi_{0.08}Zr_{0.92}Ti_{0.08}O_3$ | 36 | 21 |
| $Pb_{0.94}Bi_{0.04}Zr_{0.92}Ti_{0.08}O_3$ | 36 | 32 |
| $Pb_{0.88}Bi_{0.08}Zr_{0.94}Ti_{0.06}O_3$ | 4 | 31 |
| $Pb_{0.88}Bi_{0.08}Zr_{0.92}Ti_{0.08}O_3$ + 1 atom % U | 30 | 11 |

The electric field required to cause the transition temperature $T_2$ to coincide with the transition temperature $T_1$ is 1.5MV m$^{-1}$ for $Pb_{0.88}Bi_{0.08}Zr_{0.92}Ti_{0.08}O_3$.

It can, therefore, be seen from the foregoing that the ceramic materials according to the invention are ideally suited for the fabrication of devices such as pyroelectric infra-red radiation detectors, thermal imaging systems, temperature measuring devices and piezoelectric transducers or charge generators.

The ceramic materials according to the invention can be produced by conventional ceramic processing and sintering techniques but in order to obtain full densification and homogeneity, the production method outlined in the subsequent paragraphs in preferred.

Thus, in a method according to the invention, for producing the lead bismuth zirconate titanate materials, standardised solutions of tetra-n-butoxides of titanium and zirconium in an isopropanol solvent are prepared in a known manner and are then mixed together to form an alkoxide mixture.

The alkoxide mixture is then hydrolysed to a mixture of oxides by the controlled addition of water and the resulting slurry is dried and calcined at a temperature of approximately 600° C for a period of approximately 8 hours to provide calcined zirconia and titania powder.

The desired stoichiometric proportions of lead oxide powder and bismuth oxide powder are then mixed with the calcined zirconia and titania powder and the resulting powder mixture is then ball-milled for a period of approximately 5 hours using zirconia balls in acetone.

The milled powder mixture is then dried and sieved through a 350μm mesh.

The powder mixture is then calcined at a temperature of approximately 500° C for a period of approximately 2 hours.

The calcined powder mixture is then sieved and compacted at a pressure of 155Nmm$^{-2}$ using moulds into a desired shape.

The compacts are then hot pressed by a method which includes the steps of increasing the temperature of the compact to approximately 800° C at a rate of approximately 600° C hr$^{-1}$ and then subjecting the compact to a pressure of approximately 31N mm$^{-2}$ whilst raising its temperature from the approximate temperature of 800° to approximately 1100° C where it is held for a period of approximately 2 hours. The pressure is then removed from the compact and its temperature is reduced at a rate of approximately 100° C hr$^{-1}$ to room temperature.

In the production of ceramic materials which include potassium, the method employed is basically the same as the method outlined in preceding paragraphs for the production of lead bismuth zirconate titanate materials, except that the procedure is modified, in a manner to be subsequently outlined, after the powder mixing step. The potassium is added as potassium oxalate powder and is mixed with the other powders during the powder mixing step. This powder mixture is then ball-milled for a period of approximately one hour using zirconia balls in acetone. The milled powder is then dried and sieved through a 350μm mesh.

The powder mixture is then calcined at a temperature of approximately 700° C for a period of approximately 5 hours.

The calcined powder mixture is then re-milled for a period of approximately 4 hours using zirconia balls in acetone and the milled powder is then dried and sieved.

A binder material, for example approximately 7 weight per·cent can be mixed with the calcined powder mixture before the powder mixture is subjected to the compacting and hot pressing steps outlined in preceding paragraphs. The binder material which must be such that it is capable of being burnt out of the compact at a temperature below 500° C, is removed from the compact before the hot pressing step by subjecting the compact to a temperature of approximately 500° C for a period of approximately 2 hours. A typical binder material which can be utilised is a partly polymerised methylmethacrylate in trichlorethylene.

The method of producing ceramic materials which include uranium are basically the same as the methods outlined in preceding paragraphs, the appropriate amount of uranium being added as uranium oxide powder which is mixed with the other powders during the powder mixing step.

Any of the hot pressed materials which are produced in bulk by the methods outlined in the preceding paragraphs can be poled in a known manner and then cut, lapped and polished to a desired thickness i.e. of the order of 25μm. These thin specimens retain the unique properties of the bulk materials.

It is to be understood that the foregoing description of specific examples of this invention is made by way of example only and is not to be considered as a limitation in its scope.

What is claimed is:

1. A ceramic material which consists essentially of lead zirconate with not greater than 20 atomic per cent of bismuth substituted for the lead according to the formula $Pb_{1-(3x/2)}Bi_xZrO_3$.

2. A ceramic material as claimed in claim 1 wherein the values of $x$ are greater than 0 and not greater than 0.20.

3. A ceramic material as claimed in claim 2 wherein the lead bismuth zirconate is of formula $Pb_{0.85}Bi_{0.10}ZrO_3$.

4. A ceramic material as claimed in claim 2 wherein the lead bismuth zirconate is of formula $Pb_{0.70}Bi_{0.20}ZrO_3$.

5. A ceramic material as claimed in claim 1 which includes not more than 50 atomic per cent of titanium substituted for the zirconium according to the formula $Pb_{1-(3x/2)}Bi_xZr_{1-y}Ti_yO_3$.

6. A ceramic material as claimed in claim 5 wherein the values of $x$ lie between 0.02 and 0.20 and wherein the values of $y$ are greater than 0 and not greater than 0.50.

7. A ceramic material as claimed in claim 6 wherein the values of $x$ lie between 0.05 and 0.20 and wherein the values of $y$ lie between 0.10 and 0.50.

8. A ceramic material as claimed in claim 7 wherein the lead bismuth zirconate titanate is of formula $Pb_{0.85}Bi_{0.10}Zr_{0.60}Ti_{0.40}O_3$.

9. A ceramic material as claimed in claim 7 wherein the lead bismuth zirconate titanate is of formula $Pb_{0.70}Bi_{0.20}Zr_{0.50}Ti_{0.50}O_3$.

10. A ceramic material as claimed in claim 6 wherein the values of $x$ lie between 0.05 and 0.20 and wherein the values of $y$ lie between 0.05 and 0.10.

11. A ceramic material as claimed in claim 10 wherein the lead bismuth zirconate titanate is of formula $Pb_{0.94}Bi_{0.04}Zr_{0.92}Ti_{0.08}O_3$.

12. A ceramic material as claimed in claim 10 wherein the lead bismuth zirconate titanate is of formula $Pb_{0.88}Bi_{0.08}Zr_{0.92}Ti_{0.08}O_3$.

13. A ceramic material as claimed in claim 10 wherein the lead bismuth zirconate titanate is of formula $Pb_{0.88}Bi_{0.08}Zr_{0.94}Ti_{0.06}O_3$.

14. A ceramic material as claimed in claim 1 which includes not more than 10 atomic per cent of uranium.

15. A ceramic material as claimed in claim 5 which includes not more than 10 atomic per cent of uranium.

16. A ceramic material as claimed in claim 15 wherein the lead bismuth zirconate titanate is of formula $Pb_{0.88}Bi_{0.08}Zr_{0.92}Ti_{0.08}O_3$ and wherein the uranium concentration is 1.0 atomic per cent.

17. A ceramic material as claimed in claim 1 which includes not greater than 20 atomic per cent of potassium substituted for the lead according to the formula $Pb_{1-(3x/2)-(z/2)}Bi_xK_zZrO_3$ wherein $x$ exceeds or is equal to $z$.

18. A ceramic material as claimed in claim 17 wherein the values of $x$ and $z$ lie between 0.02 and 0.20.

19. A ceramic material as claimed in claim 5 which includes not greater than 20 atomic per cent of potassium substituted for the lead according to the formula $Pb_{1-(3x/2)-(z/2)}Bi_xK_zZr_{1-y}Ti_yO_3$ wherein $x$ exceeds or is equal to $z$.

20. A ceramic material as claimed in claim 19 wherein the values of $x$ and $z$ lie between 0.02 and 0.20 and wherein the values of $y$ are greater than 0 and not greater than 0.50.

21. A ceramic material as claimed in claim 20 wherein the lead bismuth potassium zirconate titanate is of formula $Pb_{0.86}Bi_{0.08}K_{0.04}Zr_{0.92}Ti_{0.08}O_3$.

22. A ceramic material as claimed in claim 20 wherein the lead bismuth potassium zirconate titanate is of formula $Pb_{0.84}Bi_{0.08}K_{0.08}Zr_{0.92}Ti_{0.08}O_3$.

23. A ceramic material as claimed in claim 17 which includes not more than 10 atomic per cent of uranium.

24. A ceramic material as claimed in claim 19 which includes not more than 10 atomic per cent of uranium.

25. A ceramic material as claimed in claim 22 which includes not more than 10 atomic per cent of uranium.

26. A ceramic material as claimed in claim 25 wherein the uranium concentration is 1.0 atomic per cent.

27. A method of producing a ceramic material including the steps of providing solutions of tetra-n-butoxides of titanium and zirconium in an isopropanol solvent; mixing the solutions to form an alkoxide mixture; adding water to the alkoxide mixture to form a hydrolysed slurry of mixed oxides; drying the slurry; calcining the dried slurry to provide calcined zirconia and titania powder; providing lead oxide and bismuth oxide powders in the desired stoichiometric proportions; mixing the lead and bismuth oxide powders with the calcined zirconia and titania powder to provide a fine, evenly dispersed mixture; milling the powder mixture under acetone; drying and sieving the milled powder through a 350μm mesh; calcining the powder mixture; sieving the calcined powder mixture; compacting the powder mixture into a desired shape; and hot pressing the compacted shape.

28. A method as claimed in claim 27 which includes the steps of providing a desired amount of potassium oxalate powder; mixing the potassium oxalate powders with the other powders during the powder mixing step; re-milling the calcined powder mixture under acetone; drying and sieving the re-milled powder mixture.

29. A method as claimed in claim 28 wherein a binder material is added to the powder mixture before the compacting step, the binder material being such that it is capable of being burnt out at a temperature below 500° C; and burning out the binder material before the hot pressing step.

30. A method as claimed in claim 27 wherein the powder mixture is ball-milled under acetone for a period of approximately 5 hours using zirconia balls.

31. A method as claimed in claim 27 wherein the powder mixture is calcined at a temperature of approximately 500° C for a period of approximately 2 hours.

32. A method as claimed in claim 30 wherein the powder mixture is calcined at a temperature of approximately 500° C for a period of approximately 2 hours.

33. A method as claimed in claim 28 wherein the milling and re-milling of the powder mixture under acetone is effected with zirconia balls for a period of approximately 1 hour and 4 hours respectively.

34. A method as claimed in claim 29 wherein the burning out of the binder material is effected at a temperature of approximately 500° C for a period of approximately 2 hours.

35. A method as claimed in claim 27 wherein the dried slurry is calcined at a temperature of approximately 800° C for a period of approximately 8 hours.

36. A method as claimed in claim 28 wherein the dried slurry is calcined at a temperature of approximately 800° C for a period of approximately 8 hours.

37. A method as claimed in claim 27 wherein the compacting of the powder mixture is effected at a pressure of 155N $mm^{-2}$.

38. A method as claimed in claim 28 wherein the compacting of the powder mixture is effected at a pressure of 155N $mm^{-2}$.

39. A method as claimed in claim 27 wherein the hot pressing of the compacted shape includes the steps of increasing the temperature of the compact to approximately 800° C at a rate of approximately 600° C $hr^{-1}$; subjecting the compact to a pressure of approximately 31 N $mm^{-2}$ whilst raising its temperature from the approximate temperature of 800° to approximately 1100° C; maintaining the approximate temperature of 1100° C for a period of approximately 2 hours; removing the pressure from the compact; and reducing the temperature of the compact at a rate of approximately 100° C $hr^{-1}$ to room temperature.

40. A method as claimed in claim 28 wherein the hot pressing of the compacted shape includes the steps of increasing the temperature of the compact to approximately 800° at a rate of approximately 600° C $hr^{-1}$; subjecting the compact to a pressure of approximately 31 N $mm^{-2}$ whilst raising its temperature from the approximate temperature of 800° to approximately 100° C; maintaining the approximate temperature of 1100° C for a period of approximately 2 hours; removing the pressure from the compact; and reducing the temperature of the compact at a rate of approximately 100° C $hr^{-1}$ to room temperature.

41. A method as claimed in claim 27 which includes the steps of providing a desired amount of uranium oxide powder; and mixing the uranium oxide powder with the other powders during the powder mixing step.

42. A method as claimed in claim 28 which includes the steps of providing a desired amount of uranium oxide powder; and mixing the uranium oxide powder with the other powders during the powder mixing step.

* * * * *